United States Patent [19]
Moller

[11] 4,454,943
[45] Jun. 19, 1984

[54] AUGER HOUSING CONSTRUCTION

[75] Inventor: Richard W. Moller, Fenton, Mich.

[73] Assignee: Hydreclaim Corporation, Fenton, Mich.

[21] Appl. No.: 327,755

[22] Filed: Dec. 7, 1981

[51] Int. Cl.³ .............................................. B65G 33/00
[52] U.S. Cl. ..................................... 198/657; 198/660; 198/671; 73/863.86; 73/863.91; 222/485
[58] Field of Search ............... 198/671, 861, 661, 660, 198/670, 657; 222/553, 485, 486, 519, 484; 119/52 AF; 73/863.81, 863.86, 863.91, 863.92

[56] References Cited

U.S. PATENT DOCUMENTS

| | | | |
|---|---|---|---|
| 1,095,489 | 5/1914 | Alford | 119/52 AF |
| 2,845,167 | 7/1958 | Heiken | 198/660 |
| 3,342,315 | 9/1967 | Godley | 198/671 |
| 3,435,804 | 4/1969 | Orlowski | 222/553 |
| 3,605,995 | 9/1971 | Maack | 198/660 |
| 3,799,116 | 3/1974 | Hostetler | 119/52 AF |

FOREIGN PATENT DOCUMENTS 2337277  7/1973  Fed. Rep. of Germany ........ 119/52 AF

*Primary Examiner*—Robert J. Spar
*Assistant Examiner*—Jonathan D. Holmes
*Attorney, Agent, or Firm*—Learman & McCulloch

[57] ABSTRACT

An auger housing assembly for converging material along a path has a conduit within which is located a rotary auger. The conduit has at its lower side an elongate slot through which it may pass. Such slot normally is closed by a split sleeve member carried by the conduit and which is rotatable from a first position in which it covers the slot to a second position in which the slot is uncovered.

7 Claims, 5 Drawing Figures

U.S. Patent     Jun. 19, 1984     4,454,943
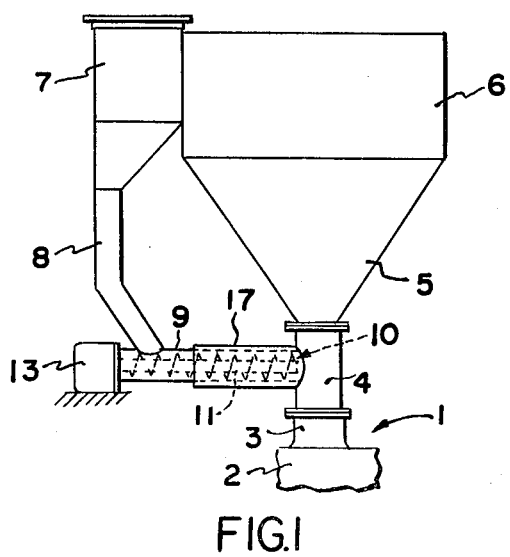
FIG.1
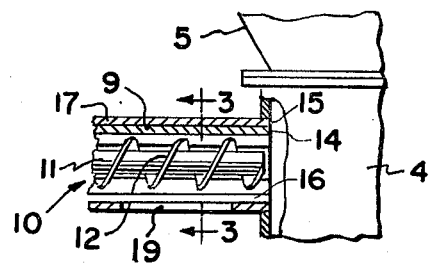
FIG.2
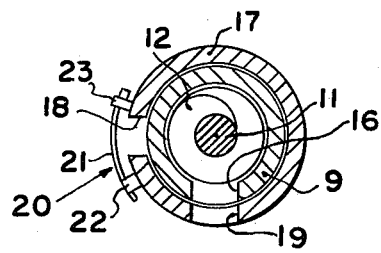
FIG.3
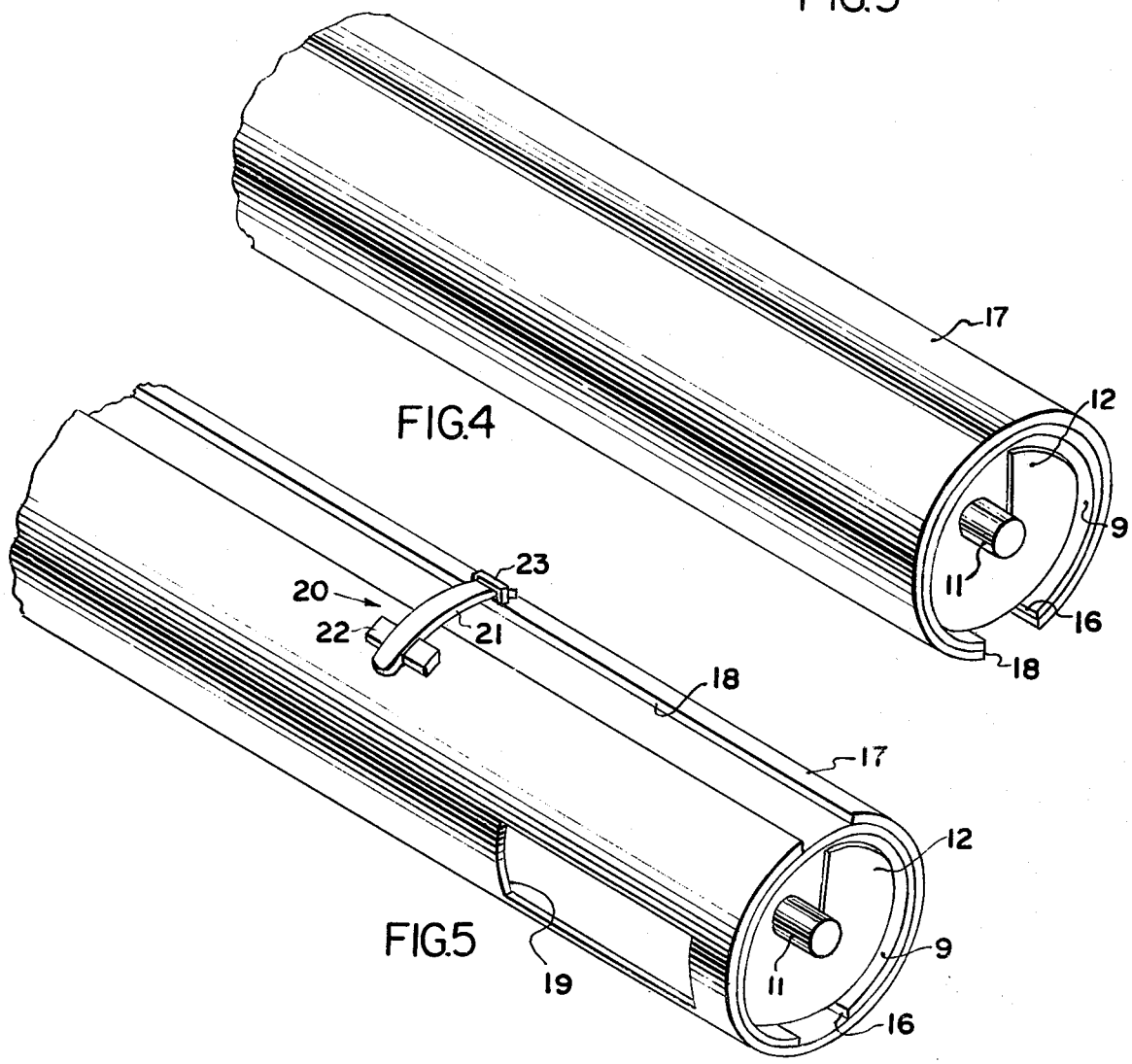
FIG.4
FIG.5

AUGER HOUSING CONSTRUCTION

BACKGROUND OF THE INVENTION

It is common practice to use an auger assembly for the feeding of various kinds of materials. The auger assembly conventionally comprises a rotary shaft equipped with a helical flight or vane positioned within a tubular conduit into one end of which material is delivered for discharge through the opposite end. From time to time it may be necessary to make a change in the materials introduced to and fed through the tubular conduit. In most instances this requires the termination of the delivery of material to the one end of the conduit, followed by driving the auger for a sufficiently long period of time to discharge all material from the opposite end of the conduit. It is possible, therefore, for a substantially long period of time to be required to discharge the contents of the conduit. Accordingly, it is an object of the present invention to provide a construction wherein the changeover from one material to another may occur substantially instantaneously.

In some installations it is advantageous to be able to vary the point at which materials are discharged from an auger housing. Apparatus constructed in accordance with the present invention makes possible such a result in addition to enabling rapid changeover from one material to another.

SUMMARY OF THE INVENTION

An auger assembly constructed according to the invention has a tubular conduit within which is a rotary shaft equipped with a helical vane. The rotary shaft may be driven by an electric, hydraulic, or other motor so as to cause material within the conduit to be conveyed in a direction from one end toward the opposite end thereof. The tubular conduit has an elongate slot extending longitudinally along the bottom of the conduit and which is of such size that material within the conduit may fall therethrough.

Fitted to the tubular conduit is a sleeve-like cover that is of such size as telescopingly to receive the conduit so as to be axially slidable and freely rotatable relative to the conduit. The sleeve has a longitudinally extending slot which may extend the full length of the sleeve and which is of such width as to correspond to the width of the slot in the tubular conduit.

The sleeve is rotatable relative to the tubular conduit between a first position in which the sleeve's slot is circumferentially spaced from the conduit's slot and a second position in which the two slots are in register. In the first position the sleeve forms a seal or cover for the conduit's slot so as to prevent material from falling therethrough. In the second position the conduit's slot is uncovered, thereby enabling material in the conduit to be discharged through the bottom.

The sleeve-like member may have at least one additional opening adjacent one end thereof and which is of less length than the axially extending slot referred to earlier. Such opening makes possible the effective lengthening or shortening of the tubular conduit. The conduit is lengthened by shifting the sleeve axially of the conduit and maintaining the sleeve's slot out of alignment with the conduit's slot. The shorter opening may be aligned with the conduit's slot to enable the discharge of material from the sleeve at a point between its ends at a point or beyond the free end of the conduit.

Shortening of the effective length of the tubular conduit is achieved by rotating the sleeve to a position in which the smaller opening is aligned with the conduit's slot and at a point between the ends of the conduit.

DESCRIPTION OF THE DRAWINGS

Apparatus constructed in accordance with a preferred embodiment of the invention is disclosed in the accompanying drawings, in which:

FIG. 1 is a side elevational view of plastic extrusion machinery equipped with apparatus constructed in accordance with the invention;

FIG. 2 is an enlarged, vertical sectional view of a portion of the apparatus shown in FIG. 1;

FIG. 3 is a sectional view taken on the line 3—3 of FIG. 2;

FIG. 4 is a greatly enlarged isometric view of apparatus in one position of adjustment; and FIG. 5 is a view similar to FIG. 4, but illustrating the apparatus in another position of adjustment.

DETAILED DESCRIPTION

Apparatus constructed in accordance with the invention is adapted for use in conjunction with machinery such as a plastic extruder 1 of conventional construction having a body 2 from which extends an upwardly open inlet 3 that is coupled to a housing 4 fixed to the lower, conical end 5 of a hopper 6 in which plastic pellets (not shown) may be stored for discharge to the extruder 1.

It is common for a storage bin 7 to be associated with the hopper 6 for containing pigmented plastic pellets which may be delivered to the extruder 1 along with the pellets from the hopper 6 and in such quantity as to enable the plastic extruded from the extruder to have desired color. Conventionally, the pigmented pellets are discharged from the bin 7 via a tube 8 that opens into and adjacent one end of tubular conduit 9 within which is an auger 10 comprising a shaft 11 on which is secured a helical vane 12. The shaft 11 is rotated by an electric, hydraulic, or other suitable motor 13 and at such speed as to enable a predetermined quantity of pigmented pellets to be discharged from the free end 14 of conduit 9.

Conventionally, a conduit corresponding to the conduit 9 has an uninterrupted bottom, thereby necessitating removal of its contents through its open end 14 only. The conduit 9, however, has an elongate slot or opening 16 that extends longitudinally of the conduit inwardly from its open end 14, the slot 16 being of such width as to ensure free passage therethrough of the pigmented pellets or other material.

Rotatably and telescopingly mounted on the conduit 9 is a sleeve-like cover 17 having a free end 15 adjacent the free end 14 of the conduit 9 and an axial slot 18 which preferably extends the full length of the sleeve. The slot 18 preferably has a width corresponding to that of the slot 16, although the slot 18 could be wider than the slot 16. It should be understood, however, that the width of the slot 18 will be sufficient to enable discharge therethrough of the contents of the conduit 9.

Adjacent the free end 15 of the sleeve 17 is another opening 19 that is of considerably less area than that of the slot 18 and which is circumferentially spaced from the latter. Preferably, the width of the slot 19 corresponds to that of the slot 18, but the axial length of the opening 19 is considerably less than that of the slot 18.

A locking device 20 has an arm 21 that bridges the slot 18 and is hinged at one end to the sleeve 17 by an anchor 22 fixed at one side of the slot 18 and has its opposite end shaped to snap into and out of a cooperable retainer 23 that is fixed to the sleeve 17 on the opposite side of the slot 18. The locking device 20 is not necessary if the sleeve 17 is made of rigid material and fits fairly snugly on the conduit 9, and the device 20 may be replaced by any one of a number of other equivalent devices.

When the sleeve 17 closes the opening 16, the latter will form a groove or channel which will be filled with material. Along the channel, therefore, the material therein forms the bottom of the conduit. The channel may be as shallow or as deep as the wall thickness of the conduit 9.

When the apparatus shown in FIG. 1 is conditioned for delivery of materials from the containers 6 and 7 to the extruder 2, the cover sleeve 17 will occupy a position such that the slot 18 and the opening 19 are out of register with the opening 16 of the conduit 9. Rotation of the auger 10, therefore, will cause material in the conduit 9 to be moved from left to right, as viewed in FIGS. 1 and 2, for discharge through the open end 14 of the conduit.

Preferably, the length of the sleeve 17 is greater than that of the slot 16. In this construction, if it should be desired to discharge the contents of the conduit 9 at a point to the right of the free end 14 of the conduit, the sleeve 17 may be moved longitudinally to the right so as to position its free end 15 beyond that of the conduit 9.

If it should be desired to clear the conduit 9 of the material therein, the sleeve 17 may be rotated to a position in which its slot 18 registers with the opening 16. All material overlying the two slots 16 and 18, therefore, will pass therethrough by gravity.

If it should be desired to discharge some portion of the contents of the conduit 9, for inspection or other purposes, the sleeve 17 may be rotated into a position in which the opening 19 registers with the opening 16, whereupon material from the conduit will pass through the openings by gravity.

The disclosed embodiment is representative of a presently preferred form of the invention, but is intended to be illustrative rather than definitive thereof. The invention is defined in the claims.

I claim:

1. Apparatus for feeding material along a conduit having an inlet, and an outlet at a discharge end axially spaced from said inlet; a rotary auger extending along said conduit adjacent its bottom for moving material along said conduit toward the outlet at its discharge end, said bottom of said conduit having an uninterrupted, elongate slot therein extending axially of said conduit and through which material from said conduit may pass; a cover member; and means mounting said cover member on said conduit for rotary and axial movements relative to said conduit, said cover member having an uninterrupted passage therein extending the entire length of said cover and through which material discharged through said slot may pass when said cover is rotatably adjusted to a position in which said passage registers with said slot, said cover having a length greater than that of said slot thereby enabling said cover to be extended axially beyond the discharge end of said conduit and effectively extend the length of said conduit when said cover occupies a position in which said passage is out of register with said slot.

2. Apparatus according to claim 1 wherein said cover is in telescoping relation with said conduit.

3. Apparatus according to claim 1 wherein said cover is external of said conduit.

4. Apparatus according to claim 1 wherein said conduit is substantially cylindrical, and wherein said cover comprises a sleeve-like member rotatably carried by said conduit.

5. Apparatus according to claim 4 wherein said sleeve-like member is external of said conduit.

6. Apparatus according to claim 1 wherein said cover member has an opening therein radially displaced from said passage and located between the ends of said cover member.

7. Apparatus according to claim 6 wherein said opening is closer to one end of said cover member than the other.

* * * * *